US012560858B2

(12) United States Patent
Tsuyuki

(10) Patent No.: US 12,560,858 B2
(45) Date of Patent: Feb. 24, 2026

(54) ADJUSTMENT DEVICE AND ELECTRONIC APPARATUS SYSTEM

(71) Applicant: CASIO COMPUTER CO., LTD., Tokyo (JP)

(72) Inventor: Yasuhiro Tsuyuki, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 377 days.

(21) Appl. No.: 18/193,081

(22) Filed: Mar. 30, 2023

(65) Prior Publication Data

US 2024/0069417 A1 Feb. 29, 2024

(30) Foreign Application Priority Data

Aug. 29, 2022 (JP) .................................. 2022-135499

(51) Int. Cl.
*G03B 21/14* (2006.01)
(52) U.S. Cl.
CPC .................................. *G03B 21/142* (2013.01)
(58) Field of Classification Search
CPC .................................................. G03B 21/142

USPC ........................................................ 359/822
See application file for complete search history.

(56) References Cited

U.S. PATENT DOCUMENTS

2015/0286111 A1 10/2015 Lenhof et al.

FOREIGN PATENT DOCUMENTS

JP WO2013121832 A1 8/2013

OTHER PUBLICATIONS

Notice of Reasons for Refusal dated Aug. 6, 2024 received in Japanese Patent Application No. 2022-135499.

*Primary Examiner* — William Choi
(74) *Attorney, Agent, or Firm* — Scully, Scott, Murphy & Presser, P.C.

(57) ABSTRACT

An adjustment device comprising a base member is configured to move an adjustment member of an electronic device and a holding member is configured to hold the base member and the electronic device, wherein the holding member includes an elastic member and holds the base member and the electronic device by a restoring force of the elastic member.

14 Claims, 12 Drawing Sheets

ADJUSTMENT DEVICE AND ELECTRONIC APPARATUS SYSTEM

TECHNICAL FIELD

The present disclosure relates to an adjustment device and an electronic apparatus system.

BACKGROUND

Conventionally, an electronic apparatus having a projection function or a photographing function has an adjusting member such as a zoom ring or a focus ring for manually performing zoom adjustment or focus adjustment. An adjustment device for fixing the adjusted adjustment member is also known.

For example, International Publication No. 2013/121832 discloses a lens device for a monitoring camera in which a zoom ring and a focus ring of the camera are provided with locking mechanisms.

In the lens device for the monitoring camera, after an operator rotates the zoom ring and the focus ring for adjustment, the zoom ring and the focus ring are fixed by a knob as a locking mechanism.

SUMMARY OF THE INVENTION

One of the advantages of the present disclosure is to provide an adjustment device and an electronic apparatus system capable of easily adjusting an electronic apparatus.

An adjustment device comprising a base member is configured to be capable of physically moving an adjustment member of an electronic device and a holding member is configured to be capable of holding the base member and the electronic device, wherein the holding member includes an elastic member and is capable of holding the base member and the electronic device by a restoring force of the elastic member.

According to the present disclosure, it is possible to provide an adjustment device and an electronic apparatus system capable of easily adjusting an electronic apparatus.

DETAILED DESCRIPTION

Figure 1:
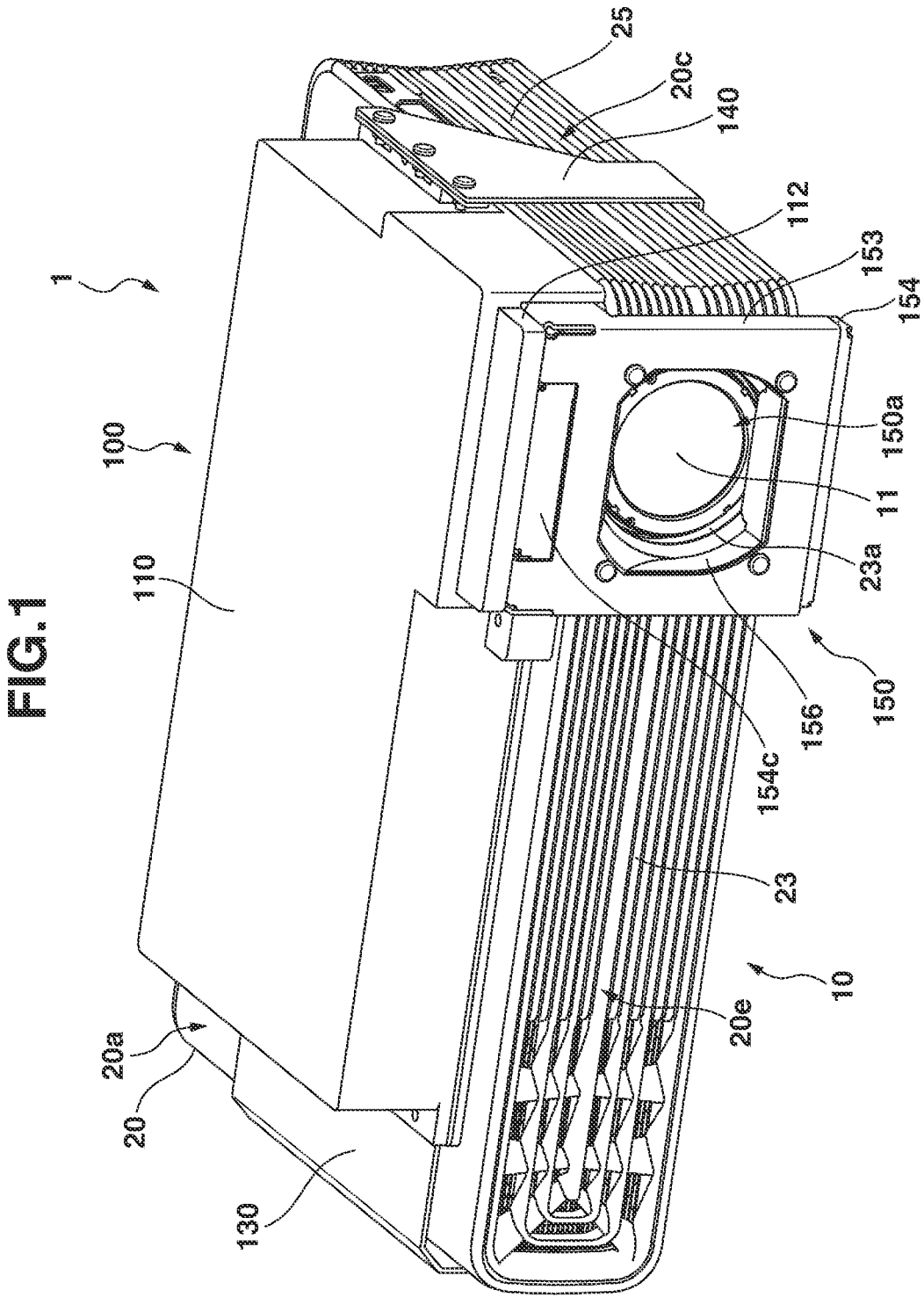
FIG. 1 is an overall perspective view of a projection apparatus to which an adjustment device is attached in an electronic apparatus system according to an embodiment, viewed from the upper left front side.
Figure 3:
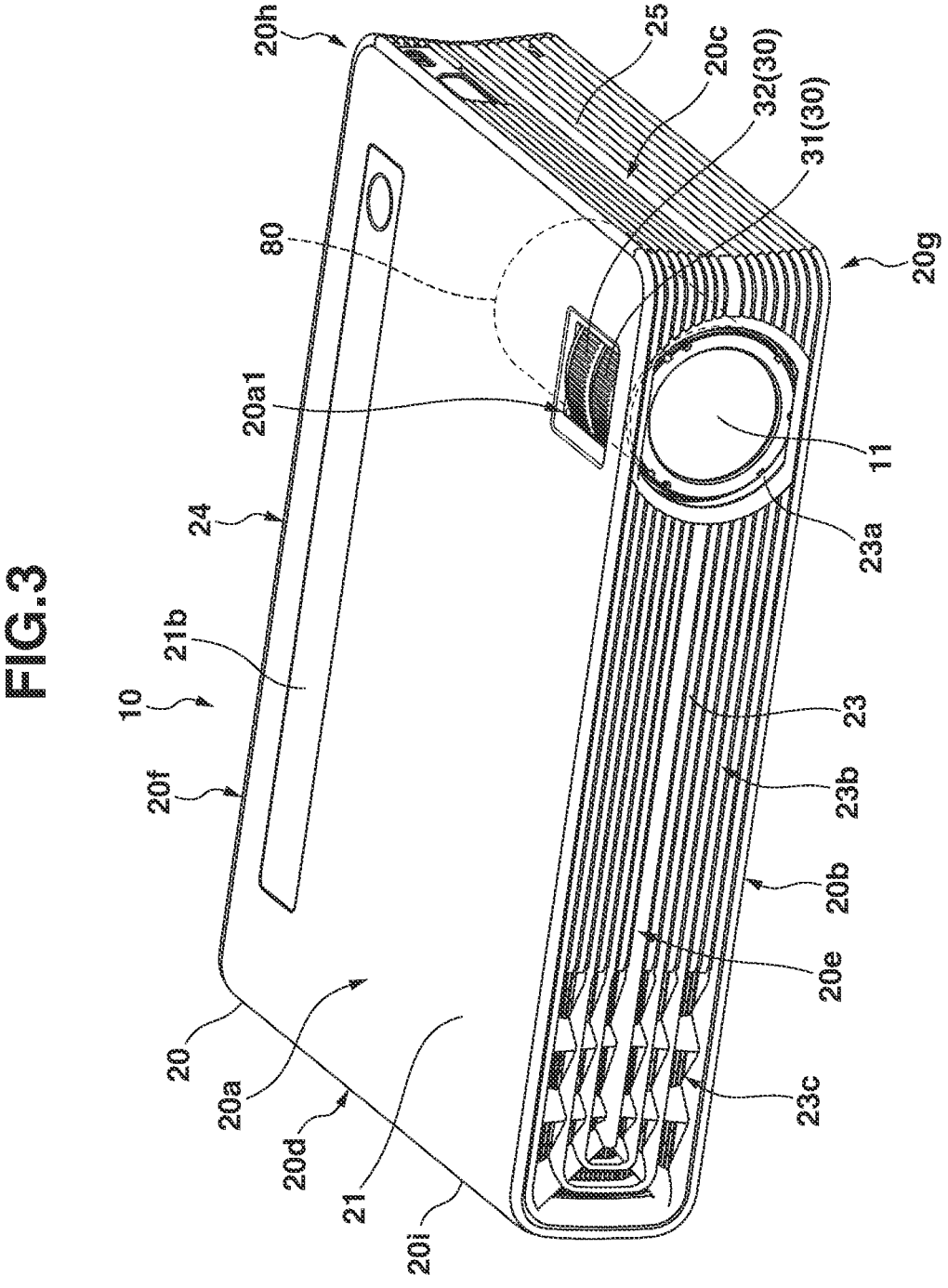
FIG. 3 is a perspective view of the projection apparatus according to the embodiment viewed from the upper left front side.

Embodiments of the present disclosure will be described below with reference to the drawings. As shown in FIG. 1, an electronic apparatus system 1 according to an embodiment includes a projection apparatus (electronic apparatus) 10 and an adjustment device 100. The adjustment device 100 is attached to the projection apparatus 10. The projection apparatus 10 will be described first. As shown in FIG. 3, the projection apparatus 10 includes a housing 20 having six surfaces in a substantially rectangular box-like shape whose longitudinal direction is in the left-right direction. Six surfaces of the housing 20 are an upper surface (first main surface) 20a, a lower surface (second main surface) 20b, a left side surface 20c, a right side surface 20d, a front surface 20e and a rear surface 20f. The projection apparatus 10 has a projection portion 11 on the front surface 20e side. The projection apparatus 10 emits projection light from the projection portion 11. In the following description, "left-right direction" means direction from one of left side and right side to the other of the left side and the right side with respect to the center direction in which projection light is emitted from the projection portion 11, and "vertical direction" means direction in thickness of the housing 20 of the projection apparatus 10.

The housing 20 includes an upper case 21 having an upper portion of the right side surface 20d and the upper surface 20a, and a lower case 22 having a lower portion of the right side surface 20d and the lower surface 20b. The housing 20 has a front panel 23 arranged on the front side, a rear panel 24 arranged on the rear side, and a left panel 25 arranged on the left side. The front panel 23 extends to a left front corner portion 20g of the housing 20, the left front corner portion 20g has a curved shape. In the front panel 23, a projection opening 23a of the projection portion 11, an intake port 23b, and an exhaust port 23c are provided. The rear panel 24 extends to the left rear corner portion 20h, the left rear corner portion 20h has a curved shape. The rear panel 24 is provided with other air intake port and a connection port such as an image input/output connector. The thickness of the housing 20 is, for example, 40 to 45 mm.

Figure 5:
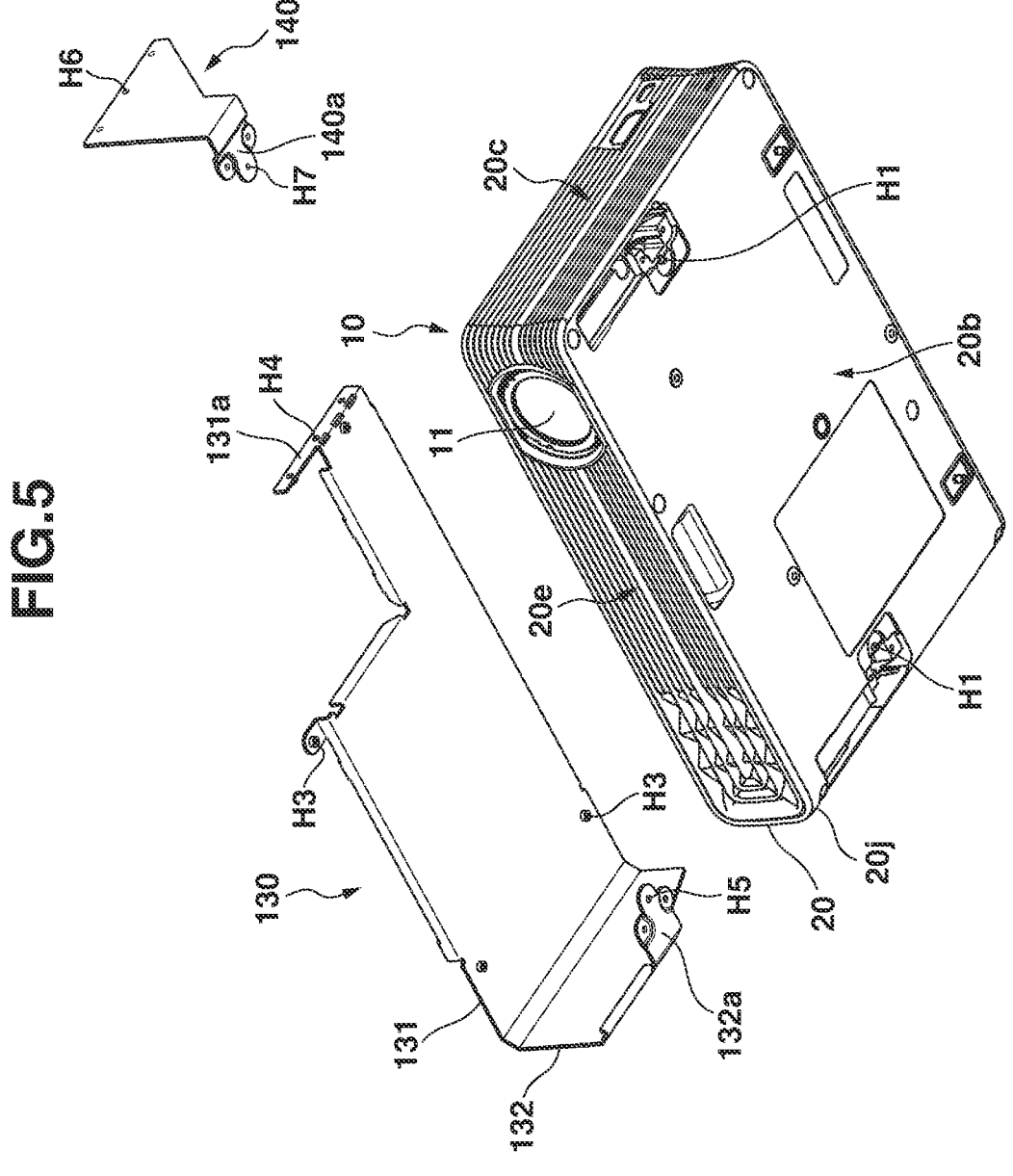
FIG. 5 is an exploded perspective view showing the projection apparatus to which a first holding metal plate and the second holding sheet metal of the adjustment device are attached, viewed from the left front lower side.

An edge portion 20i between the upper surface 20a and the right side surface 20d of the projection apparatus 10 and an edge portion 20j between the lower surface 20b and the right side surface 20d of the projection apparatus 10 have curved corners, and both curved surfaces are formed in the front-rear direction. An edge portion other than the edge portions 20i and 20j of the housing 20, such as an edge portion between the upper surface 20a and the left side surface 20c, is substantially sharp. On the upper surface 20a of the upper case 21, an operation panel 21b capable of setting the projection apparatus 10 is provided. A connection port 29k for a power plug is provided on the right side surface 20d of the lower case 22. As shown in FIG. 5, a plurality of first screw holes H1 for attaching a tilt mechanism to the housing 20 of the projection apparatus 10 are provided in the vertical direction at positions slightly forward of the left and right ends of the lower surface 20b of the lower case 22.

As shown in FIG. 3, a lens barrel 80 is housed in the housing 20 of the projection apparatus 10. The lens barrel 80 includes a rotating object having a focus adjustment ring 31 and a zoom adjustment ring 32 as a plurality of adjustment rings 30 which are rotatable adjustment members. The focus adjustment ring 31 and the zoom adjustment ring 32 are provided in a substantially semi-circular ring shape around the optical axis of the lens barrel 80 (see FIG. 12), and are knurled on their outer peripheries. An adjustment opening 20a1 opened in substantially rectangular shape is provided on the front left corner side of the upper surface 20a of the housing 20.

Figure 12:
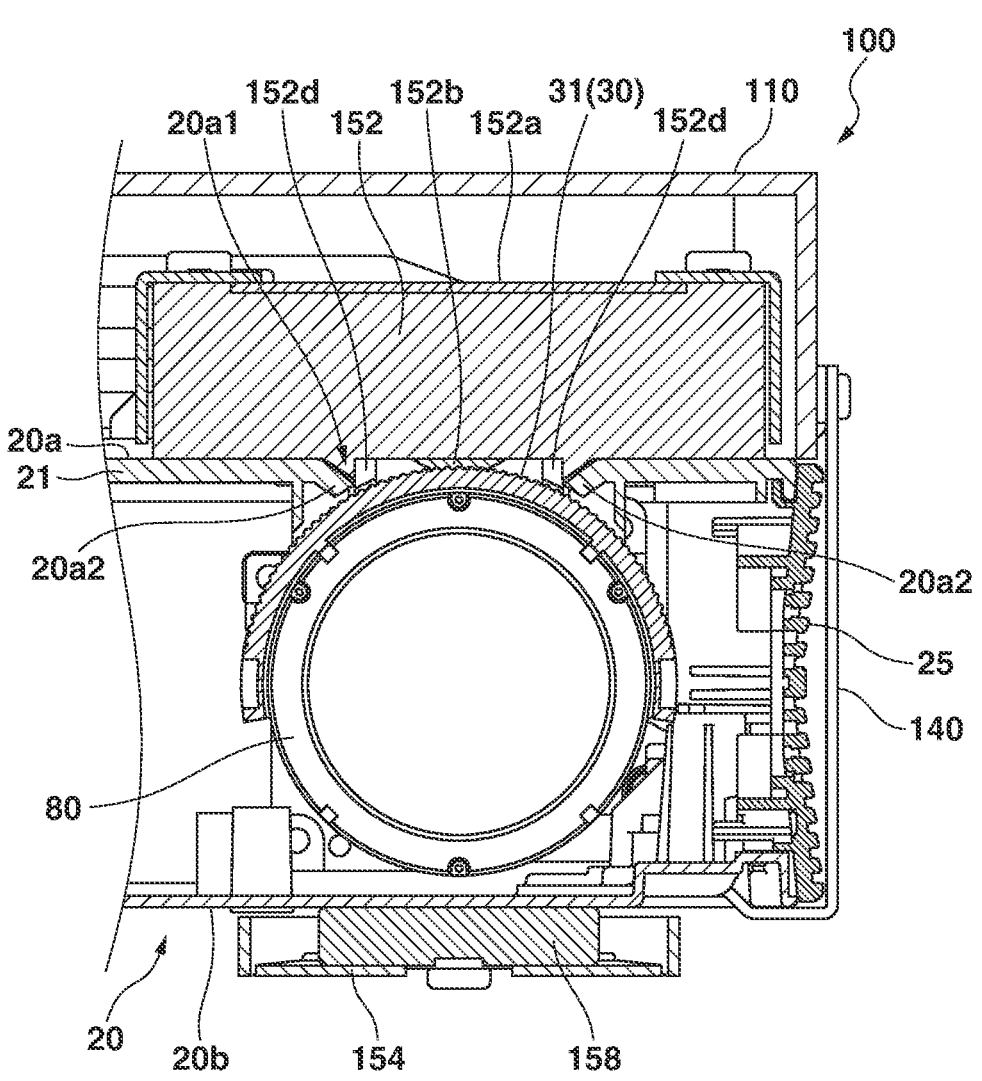
FIG. 12 is a cross-sectional view of a projection left and right direction around a projection opening of the projection apparatus to which the adjusting device is attached.

The focus adjustment ring 31 and the zoom adjustment ring 32 are exposed from the adjustment opening 20a1. In a state in which the adjustment device 100 is not attached to the projection apparatus 10, the adjustment rings 30 can be manually rotated around the optical axis of the lens barrel 80 in the clockwise and counterclockwise directions, therefore the lens barrel 80 can be adjusted in focus and zoom according to the amount of rotation. Here, as shown in FIG. 12, end edges 20a2 of the upper surface 20a, which are arranged opposite to each other on the left and right sides of the adjustment opening 20a1, are provided so as to extend in the front-rear direction along the adjustment opening 20a1 and are inclined downward toward the adjustment rings 30. The lower surfaces of the tips of the end edges 20a2 inclined downward are formed in a flat surface shape and have a gap of 1 mm or less with the corresponding adjustment rings 30 respectively. Hence even if at least one of the adjustment rings 30 is rotated, the at least one of the adjustment rings 30 does not come into contact with the end edges 20a2.

The adjustment device 100 for adjusting the focus adjustment ring 31 and the zoom adjustment ring 32 can be detachably attached to the housing 20 by covering the adjustment opening 20a1. The configuration of the adjustment device 100 will be described below. As shown FIGS. 1 and 4, the adjustment device 100 includes a protective cover 110, a drive substrate 120, a first holding metal plate 130, a second holding metal plate 140, and an adjustment unit 150. The protective cover 110, drive substrate 120 and the first holding metal plate 130 are attached to the upper surface 20a side of the housing 20, the second holding metal plate 140 is attached to the left side surface 20c side of the housing 20, and the adjustment unit 150 sandwiches the housing 20 in the vertical direction and is attached to the front surface 20e side of the housing 20.

Figure 2:
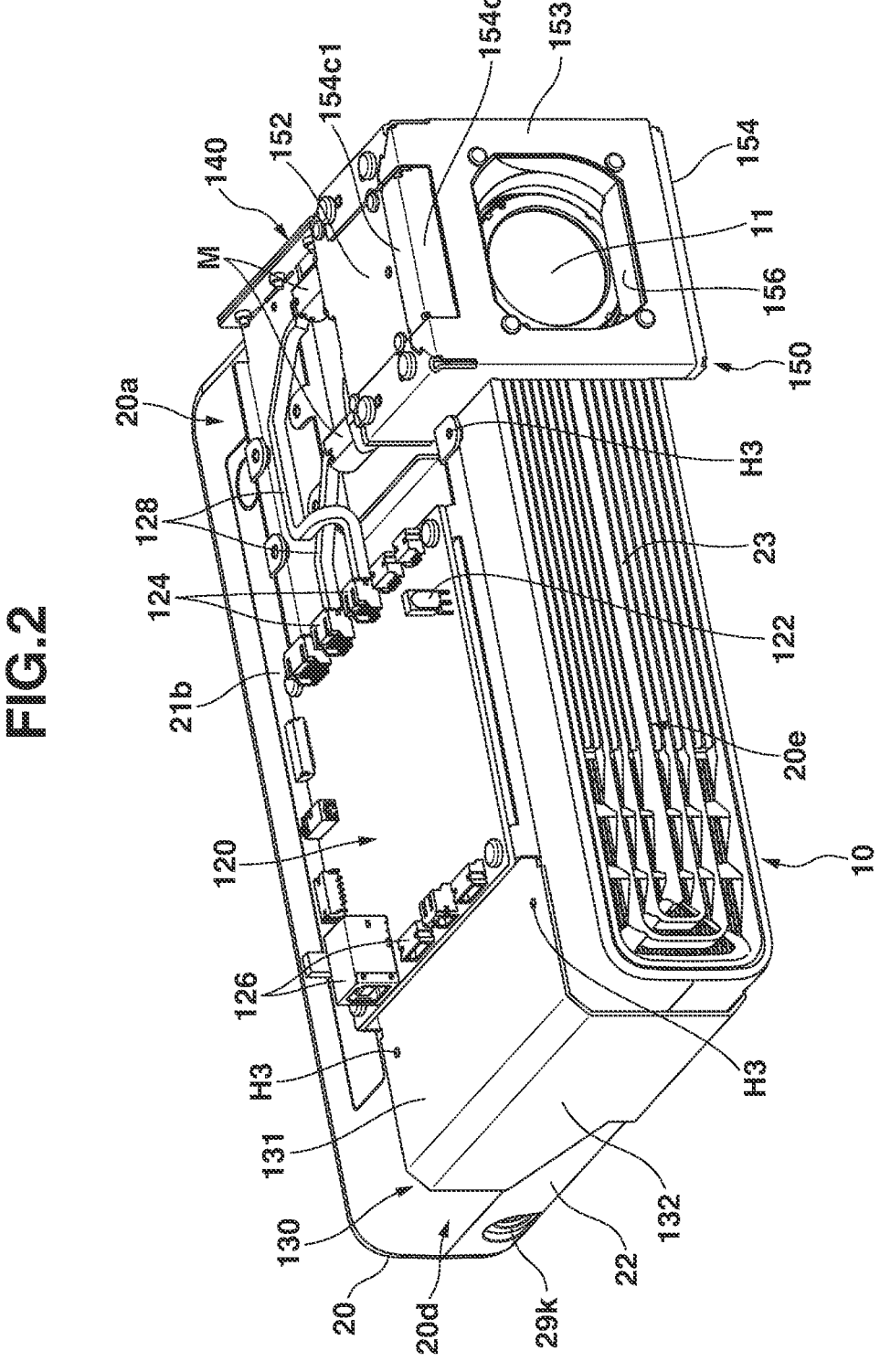
FIG. 2 is a perspective view of the projection apparatus to which the adjustment device is attached except for a protective cover, viewed from the upper right front.
Figure 4:
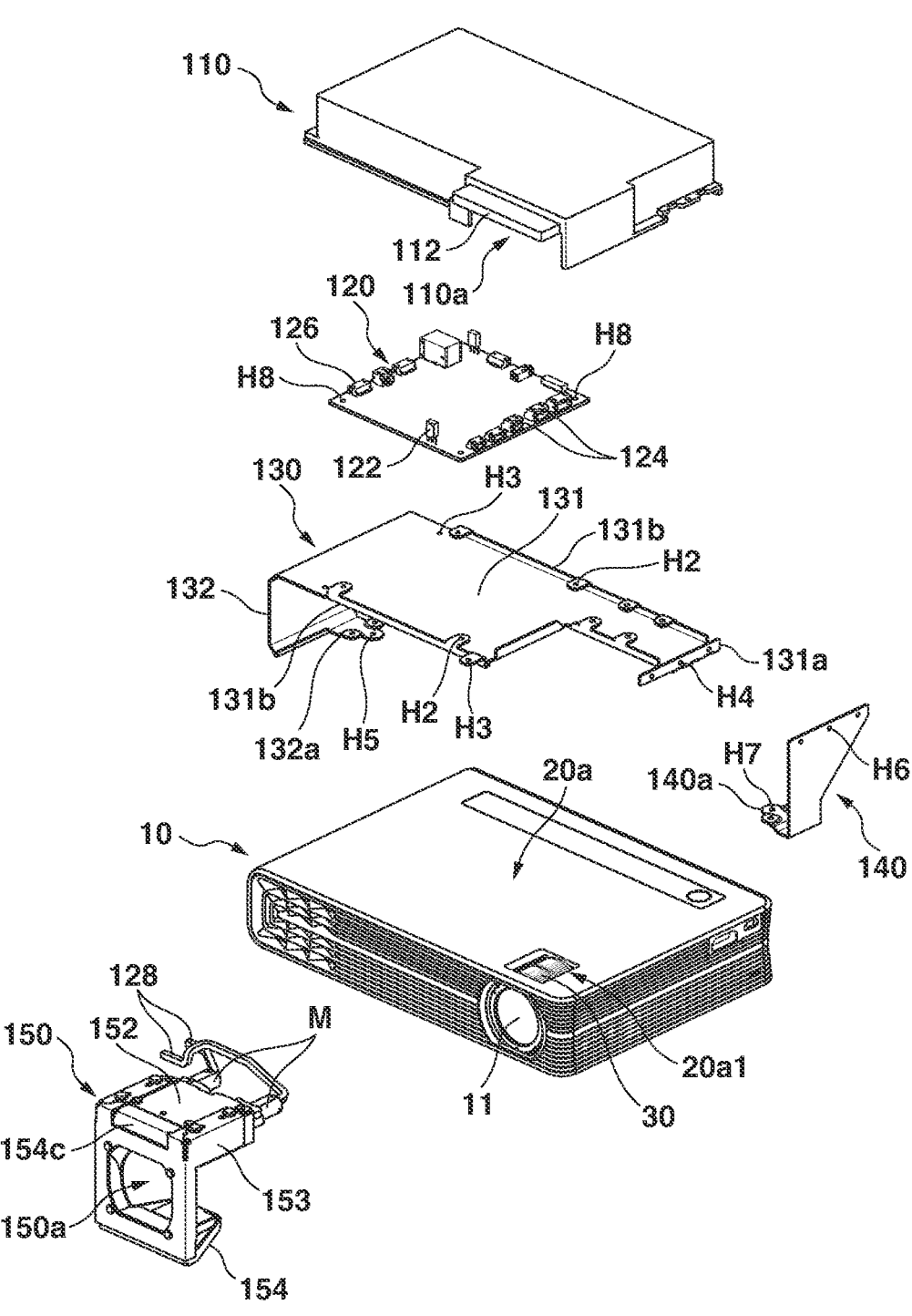
FIG. 4 is an exploded perspective view of the adjustment device according to the embodiment.

As shown in FIGS. 2, 4, and 5, the first holding metal plate 130 is a substantially L-shaped plate member integrally formed of a sheet metal material, and has the first plate portion 131 and the second plate portion 132 extending substantially at a right angle from a right edge portion of the first plate portion 131. The first plate portion 131 covers most of the upper surface 20a of the housing 20 except the operation panel 21b and is mounted on the upper surface 20a. A portion of the first plate portion 131 corresponding to the adjustment opening 20a1 of the housing 20 lacks in a substantially rectangular shape. Therefore, the adjustment opening 20a1 of the upper surface 20a is not covered with the first plate portion 131.

A pair of mounting wall sections 131b are provided at both front and rear ends of the first plate portion 131 so as to extend in the left-right direction. The pair of mounting wall sections 131b are bent and protruded with respect to a main surface of the first plate portion 131. In the top portion of the pair of mounting wall sections 131b, projecting pieces projecting toward each other are provided at positions corresponding to four vertices of a substantially regular quadrangular shape when viewed from above. Second screw holes H2 for attaching the drive substrate 120 are provided to the projecting pieces so as to pass through in the vertical direction. The drive substrate 120 is supported by the projecting pieces so as to be separated from the main surface of the first plate portion 131. Therefore, the electronic apparatus system 1 has a structure in which heat generated when the drive substrate 120 is driven hardly propagates to the housing 20 of the projection apparatus 10 or in which heat generated in the housing 20 of the projection apparatus 10 hardly propagates to the drive substrate 120. Third screw holes H3 for attaching the protective cover 110 are provided at two places of the right side portion of the first plate portion 131 and at one place of the front side portion, respectively, so as to pass through in the vertical direction. A mounting wall portion 131a slightly rising upward is provided at the left edge portion of the first plate portion 131. A plurality of fourth screw holes H4 for attaching the second holding metal plate 140 are provided in the mounting wall portion 131a so as to penetrate in the horizontal direction.

The second plate portion 132 of the first holding metal plate 130 is in contact with the right side surface 20d of the housing 20 in a state where the first plate portion 131 is placed on the upper surface 20a of the housing 20. A part of the lower end portion on the lower side of the second plate portion 132 extends to the lower surface 20b side of the housing 20 and is bent inward at a substantially right angle to form a lower surface contact portion 132a contacting with the lower surface 20b of the housing 20. In the lower surface contact portion 132a, a plurality of fifth screw holes H5 for attaching the first holding metal plate 130 to the housing 20 are provided so as to penetrate in the vertical direction.

The second holding metal plate 140 is a substantially triangular plate-shaped member integrally formed of a sheet metal material, and is connected to the first holding metal plate 130. The second holding metal plate 140 is disposed on the left side surface 20c of the housing 20. A plurality of sixth screw holes H6 are provided on one end side of the second holding metal plate 140 so as to penetrate in the left-right direction at positions corresponding to the plurality of fourth screw holes H4 of the first holding metal plate 130, respectively. The second holding metal plate 140 is screwed from the outside in such a manner that the sixth screw holes H6 overlap with the fourth screw holes H4 of the first holding metal plate 130 placed on the upper surface 20a of the housing 20. Therefore, the second holding metal plate 140 is fixed to the left side surface 20c of the housing 20 and is connected to the first holding metal plate 130.

The main surface of the second holding metal plate 140 extends from the upper surface 20a to the lower surface 20b of the housing 20. A lower surface contact portion 140a is provided at a lower end portion connected to the main surface of the second holding metal plate 140. The lower surface contact portion 140a contacts with the lower surface 20b of the housing 20 while being bent at a substantially right angle inside the housing 20 at a position near the lower surface 20b of the housing 20 A plurality of seventh screw holes H7 for attaching the second holding metal plate 140 to the housing 20 are provided in the lower surface contact portion 140a so as to penetrate in the vertical direction. As shown in FIG. 5, the first holding metal plate 130 and the second holding metal plate 140 are fixed to each other by screws inserted from below in a state in which the first holding metal plate 130 and the second holding metal plate 140a are connected to each other such that the fifth screw holes H5 and seventh screw holes H7 are overlapped with the first screw holes H1 respectively. Therefore, the first holding metal plate 130 and the second holding metal plate 140 sandwich the left and right sides of the housing 20 in the vertical direction, respectively, in the housing 20.

As shown in FIG. 2, the drive substrate 120 is a circuit board for driving the adjustment unit 150 and has a substantially rectangular shape. At each of the four corners of the drive substrate 120, an eighth screw hole H8 is provided so as to penetrate in the vertical direction. The drive substrate 120 is mounted on the first plate portion 131 of the first holding metal plate 130 by screwing from above in a state in which each of the eighth screw holes H8 is overlapped with each of the four second screw holes H2 of the first holding metal plate 130. On an upper surface side of the drive substrate 120, there are provided a receiving member 122 for receiving a drive signal for driving two drive motors M of the adjustment unit 150 to be described later from the outside (remote control or the like), two motor connection terminals 124 connected to the drive motors M via connection wirings 128 respectively, and other connection terminals 126. The driving signal may be light such as infrared light, and the receiving member 122 may be a light receiving sensor that receives signal light in the wavelength band of the driving signal.

The protective cover 110 is formed in a substantially box-like shape that opens downward, and is made of a transparent material that transmits signal light in the wavelength band of the drive signal. Therefore, even when the receiving member 122 is covered with the protective cover 110, a signal can reach the receiving member 122. A cover opening 110a opening forward is provided to a front left side portion of the protective cover 110. An eaves portion 112 having an eaves shape is provided above the cover opening 110a. The eaves portion 112 extends substantially horizontally along an opening end on the cover opening 110a. An upper portion of the adjustment unit 150 is accommodated in the cover opening 110a.

The protective cover 110 is attached to the housing 20 so as to cover a base member 152 (described later) of the adjustment unit 150 and the drive substrate 120. Cover side screw holes of the protective cover 110 are provided in the vertical direction at positions corresponding to the third screw holes H3 in the first holding metal plate 130. After attaching the first holding metal plate 130, the second holding metal plate 140, drive substrate 120, and the adjustment unit 150 to the housing 20, the protective cover 110 is attached to the housing 20 by screwing from below in a state in which the cover side screw hole of the protective cover 110 is overlapped with the third screw hole H3 of the first holding metal plate 130. That is, the protective cover 110 is a last piece for attaching to the housing 20 when the respective constituent members of the adjustment device 100 are attached to the housing 20. The protective cover 110 covers the base member 152 and the drive substrate 120 so as to protect these members, from the outside.

Figure 6:
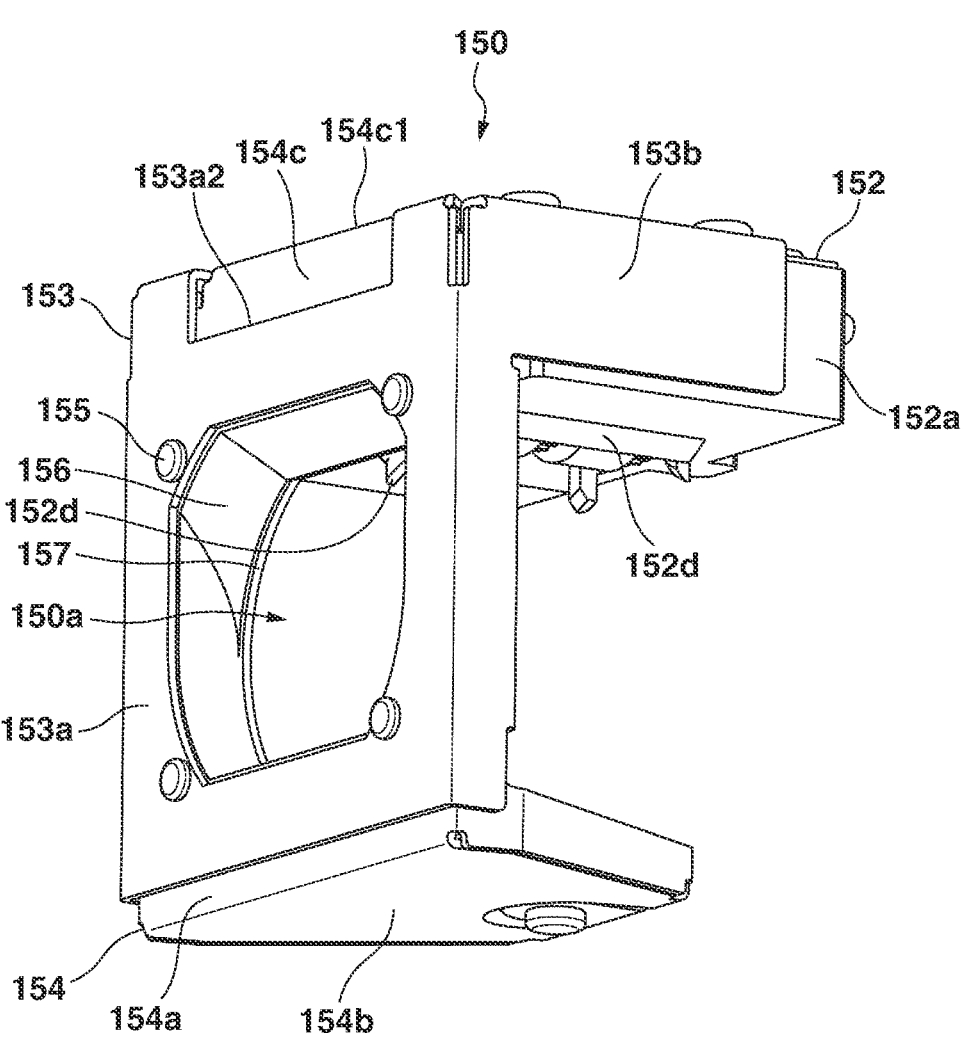
FIG. 6 is a perspective view of an adjustment unit of the adjustment device according to the embodiment of the present disclosure, viewed from the lower left front side.
Figure 7:
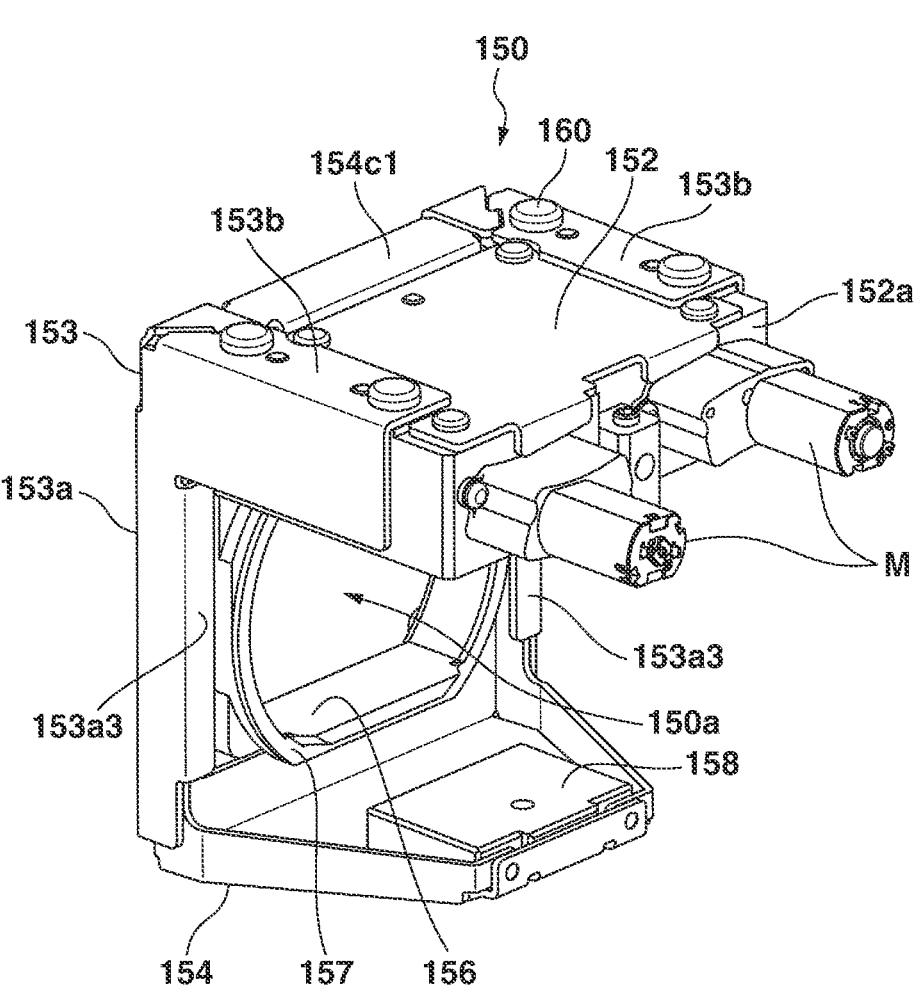
FIG. 7 is a perspective view of the adjustment unit of the adjustment device according to the embodiment as viewed from the upper left rear side.
Figure 8:
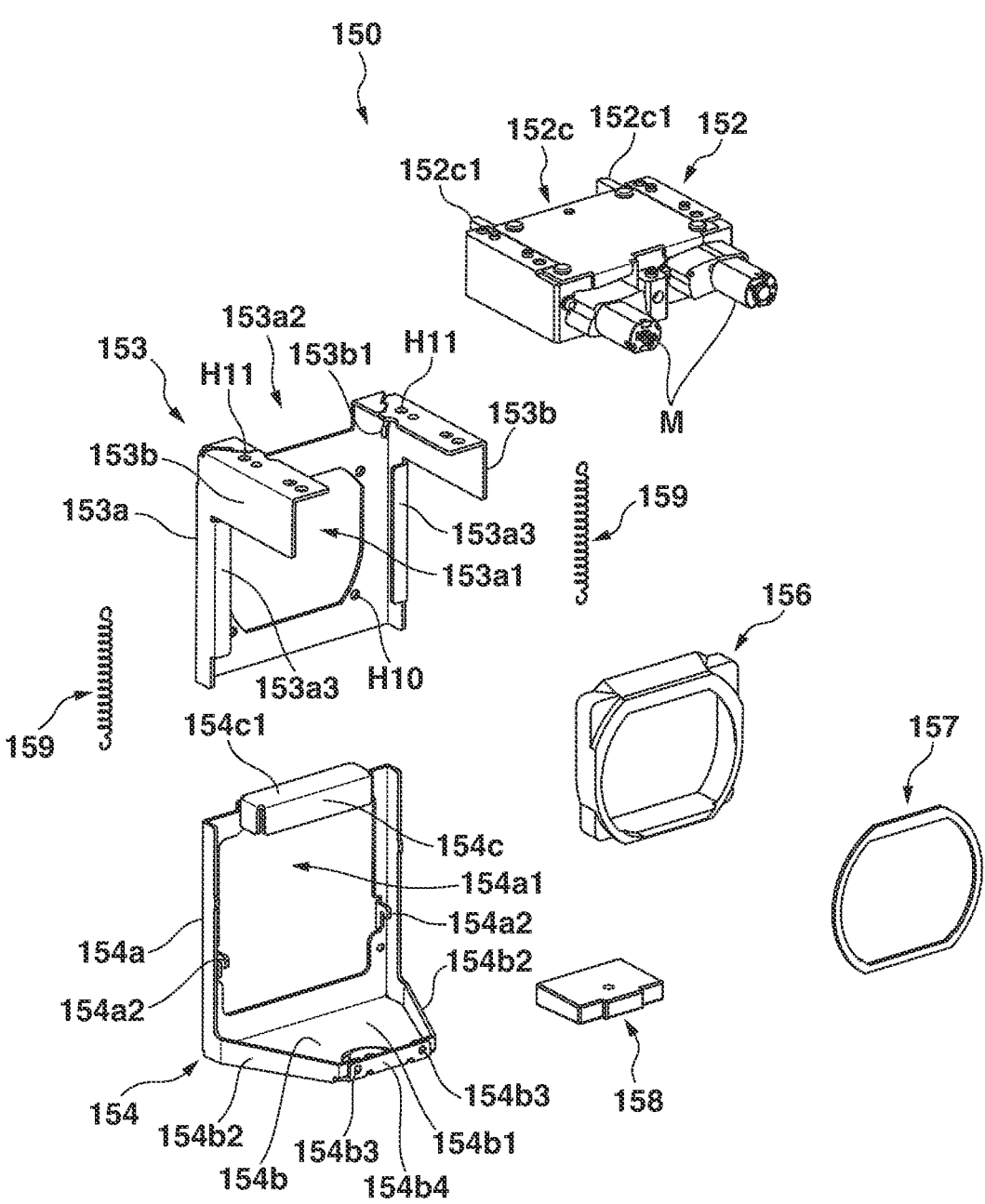
FIG. 8 is an exploded perspective view of the adjustment unit of the adjustment device according to the embodiment.

Next, the configuration of the adjustment unit 150 will be described in detail. The adjustment unit 150 is a substantially concave member which is open to the rear side. As shown in FIGS. 6 to 8, the adjustment unit 150 includes a base member 152 facing the upper surface 20a of the housing 20, a first frame (holding member) 153, a second frame (holding member) 154, a dust-proof member (sealing member) 156, a dust-proof packing (sealing member) 157, a pressing pad 158, and a pair of spring members (elastic members) 159 In the front portion of the adjustment unit 150, there is provided a unit opening 150a having a substantially rectangular shape, which is slightly larger than the projection portion 11. The adjustment unit 150 is attached to the housing 20 so as to sandwich the housing 20 in the vertical direction so that the unit opening 150a overlaps with the projection portion 11 of the projection apparatus 10 in the front-rear direction (see FIG. 2).

As shown in FIG. 8 and the like, the base member 152 is a member in the shape of a substantially rectangular parallelepiped shape, and has a mechanism for adjusting the adjustment rings 30 of the projection apparatus 10. The base member 152 includes a case body 152a, the two drive motors M, two rotating bodies (rubber rollers) 152b, and a gear mechanism provided in the case body 152a. The two drive motors M are arranged on the right and left sides and are exposed to the rear side of the case body 152a. Also, the two drive motors M are driven by a drive signal input from the drive substrate 120. The two rotating bodies 152b are disposed in front and back sides of the bottom of the base member 152 respectively, and their lower portions are slightly exposed from the bottom of the case body 152a (see FIGS. 9 to 12).

Figure 9:
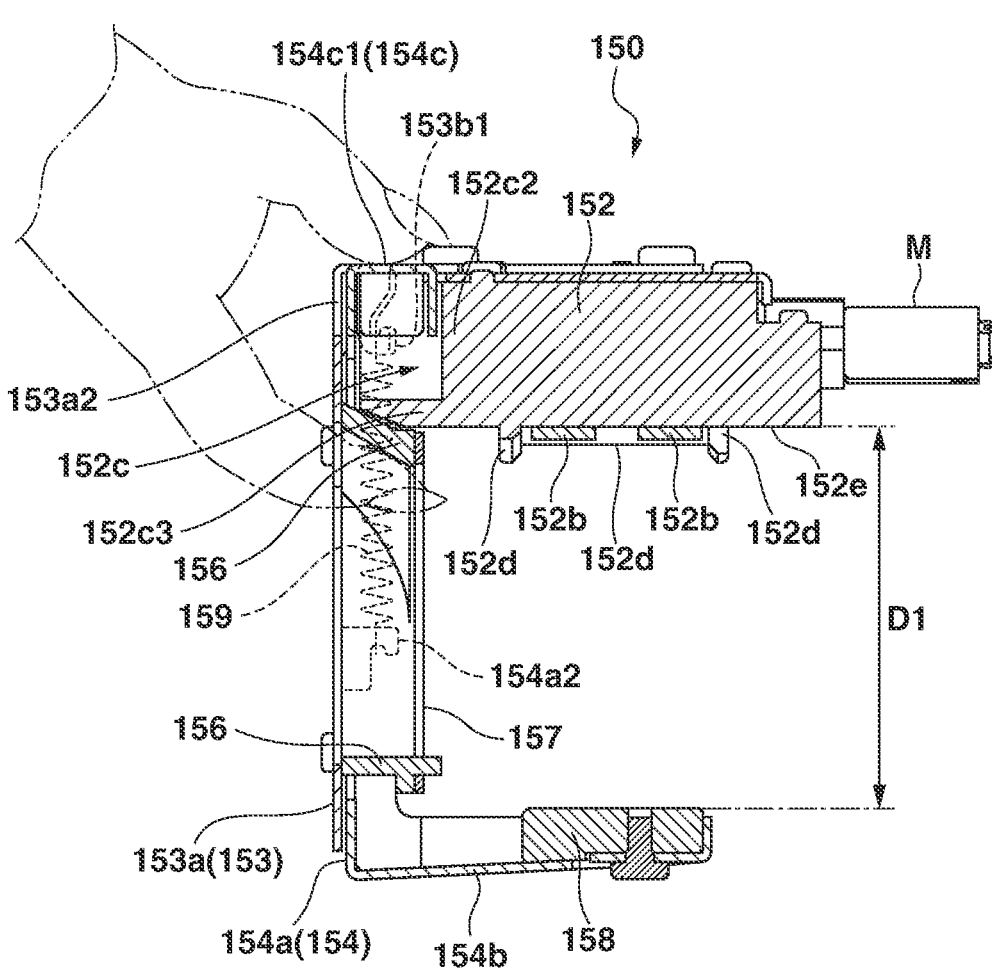
FIG. 9 is a cross-sectional view along the front-rear direction of the projection apparatus showing a step 1 for attaching the adjustment unit of the adjustment device to the projection apparatus.

As shown in FIGS. 8 and 9, there is a pair of side wall portions 152c1, a rear wall portion 152c2, and a bottom wall portion 152c3 in the front side of the case body 152a. The pair of side wall portions 152c1 which are plate members having thickness in the left-right direction, are disposed so as to face each other in the left-right direction and protrude toward the front direction. The rear wall portion 152c2 which is flat member having a surface extending in the left-right direction and the vertical direction, is disposed so as to be sandwiched between the pair of side wall portions 152c1. The bottom wall portion 152c3 which is plate member having thickness in the vertical direction, is disposed on the lower edge of the rear wall portion 152c2 and protrudes toward the front direction. Push-down space 152c is space surrounded by the pair of side wall portions 152c1, the rear wall portion 152c2, and the bottom wall portion 152c3 of the base member 152. The push-down space 152c is space for accommodating a push portion 154c of a second frame 154 described later, it is open to the front and upward. As shown in FIGS. 6 and 9, engaging projections 152d formed in a protruding shape toward the lower side is provided around a portion of the lower surface of the case body 152a where the two rotating bodies 152b are exposed. The engaging projection 152d is provided along the opening end (except the rear side) of the adjustment opening 20a1 of the housing 20. The engaging projections 152d include a pair of projections extending in the front-rear direction on both left and right sides of the opening end, projections projecting on both left and right sides of the rear of the opening end, and an arc-shaped projection projecting at both left and right sides in front of the opening of the lower portion of the case body 152a in accordance with an outer shape of the lens barrel 80 so as to fit the lens barrel 80. The lengths of the respective projections projecting from the lower surface of the case body 152a are, for example, 3 to 5 mm, respectively.

The base member 152 which covers a portion around the adjustment opening 20a1 is accurately attached to the housing 20 because the engaging projections 152*d* of the base member 152 are engaged with the opening end of the adjustment opening 20*a*1. More specifically, as shown in FIG. 12, the base member 152 is mounted so that the two rotating bodies 152*b* are brought into contact with the focus adjustment ring 31 and the zoom adjustment ring 32 exposed from the adjustment opening 20*a*1 in the vertical direction. In the base member 152 mounted around the adjustment opening 20*a*1 in this manner, the two rotating bodies 152*b* are driven to rotate via an internal gear mechanism by driving the two drive motors M. The focus adjustment ring 31 and the zoom adjustment ring 32 to which the respective rotating bodies 152*b* are pressed are physically rotated in accordance with the rotation of the respective rotating bodies 152*b*. Therefore, the focus adjustment and the zoom adjustment of the lens barrel 80 are electrically operated.

A first frame 153 is a metal frame member, and has a first frame portion 153*a* and a pair of first extension portions (both side surfaces) 153*b*. The first frame portion 153*a* is a frame plate member having an opening at the center, and the pair of first extension portions 153*b* extend rearward from both left and right sides of the upper end portion of the first frame portion 153*a*. A first opening 153*a*1 having a substantially rectangular shape which opens one size larger than the projection portion 11 of the projection apparatus 10 is provided in the central portion of the first frame portion 153*a*. At four corners around the first opening 153*a*1, tenth screw holes H10 for attaching the ring-shaped dust-proof member 156 are provided so as to penetrate in the front-rear direction. On the upper end side of the first frame portion 153*a*, there is depression portion 153*a*2 which is absent in a substantially rectangular shape so as to be opened upward. The push-down space 152*c* is opened in the forward direction by the depression portion 153*a*2. On both left and right sides of the rear portion of the first frame portion 153*a*, projecting portions 153*a*3 slightly projecting inward (toward the first opening 153*a*1) are provided respectively. Each of the projecting portions 153*a*3 has a shape extending in the vertical direction.

Each of the first extension portions 153*b* has a shape of two sides that are bent substantially perpendicularly to each other. The two sides of the first extension portion 153*b*, are composed of a plate portion oriented in the vertical direction and a plate portion oriented in the horizontal direction when the first frame 153 is viewed from the rear side. A plurality of eleventh screw holes H11 for screwing and connecting the base member 152 are formed so as to penetrate in the vertical direction in the plate portion facing in the vertical direction of each of the first extension portions 153*b*. In a state in which the outer surface of the case body 152*a* is brought into contact with the inner surface side of each of the first extension portions 153*b* and in which the press space 152*c* is exposed to the depression portion 153*a*2 side, the left and right sides of an upper surface of the case body 152*a* are fixed to each of the first extension portions 153*b* via the eleventh screw hole H11 by mounting screws 160. Therefore, as shown in FIG. 7, the base member 152 is attached to an upper portion of the adjustment unit 150. On the inner surface side of the front end portion of each of the first extension portions 153*b*, there are first hook portions (first engaging pieces) 153*b*1 in the shape of hooks to which one ends side of the spring members 159 are engaged along the vertical direction respectively (see FIGS. 8 and 9).

The second frame 154 is a metal frame member having the second frame portion 154*a*, the second extension portion 154*b* and the push portion 154*c*. The second frame portion 154*a* is a frame plate-shaped member having an open center, the second extension portion 154*b* is a member extending rearward from the lower end portion of the second frame portion 154*a*, and the push portion 154*c* is disposed on the upper end side of the second frame portion 154*a*. A second opening portion 154*a*1 having a substantially rectangular shape which opens one size larger than the first opening 153*a*1 of the first frame 153 in the center portion of the second frame portion 154*a*. In portions on both left and right sides of the opening end of the second opening portion 154*a*1, second hook portions (second engaging pieces) 154*a*2 having hooks to which the other end sides of the spring members 159 are engaged respectively. The second hook portions 154*a*2 project rearward.

The second extension portion 154*b* includes a bottom portion 154*b*1, two first wall portions 154*b*2, two welded portions 154*b*3, and a second wall portion 154*b*4. The bottom portion 154*b*1 extends in a substantially trapezoidal shape whose width in the left-right direction is gradually shortened toward the rear side, and has a substantially dish shape opened upward. The two first wall portions 154*b*2 are provided along the left and right peripheral edges of the bottom portion 154*b*1, and are bent upward. The second wall portion 154*b*4 is a plate-shaped member extending in the front-rear direction, and is spot welded at the welded portions 154*b*3 so as to overlap with the portion bent upward along a top base of the substantially trapezoidal shape Therefore, the second wall portion 154*b*4 and each of the first wall portions 154*b*2 are firmly connected to each other. The pressing pad 158 is accommodated and attached to an upper surface side of the second extension portion 154*b*. The second frame portion 154*a* and the second extension portion 154*b*, which are formed in a state of being connected by bending one metal plate, are substantially L-shaped when viewed from the lateral side. As shown in FIG. 9, the second extension portion 154*b* is inclined slightly upward from the front side toward the rear side. The two first wall portions 154*b*2, the welded portions 154*b*3, and the second wall portion 154*b*4 are connected to the bottom portion 154*b*1, so that the strength is improved. The push portion 154*c* is provided on a rear surface side of the upper end portion of the second frame portion 154*a*, and is formed in the shape of a rectangular column elongated in the left-right direction. The outer shape and size of the push portion 154*c* are substantially equal to the shape and size of the push-down space 152*c* provided in the base member 152. An upper surface of the push portion 154*c* is a push-down surface 154*c*1 that can be pushed down by an operator.

The dust-proof member 156 is annular member made of resin. The shape and size of the opening of the dust-proof member 156 substantially coincide with the shape and size of the first opening 153*a*1 of the first frame 153. The dust-proof member 156 is screwed to the first frame portion 153*a* by a mounting screw 155 in a state in which the dust-proof member 156 is in contact with a rear surface side of the first frame portion 153*a*. More specifically, the dust-proof member 156 is attached to the first frame 153 by the mounting screw 155 screwed from the front side of the first frame portion 153*a* through the tenth screw holes H10 of the first frame portion 153*a*. The dust-proof packing 157 is an annular packing made of rubber. The shape and size of the opening of the dust-proof packing 157 substantially coincide with the shape and size of the opening of the dust-proof member 156 (the shape and size of the first opening 153*a*1). The dust-proof packing 157 is attached to a rear surface of the dust-proof member 156 by adhesion or the like so that the opening thereof coincides with the opening of the dust-proof member 156. The first opening 153a1, the dust-proof member 156, and the dust-proof packing 157 define the unit opening 150a.

The pressing pad 158 functions as a buffer member when the adjustment unit 150 is attached to the projection apparatus 10, and is formed as a thick plate-like member made of resin. The pressing pad 158 is attached to the upper surface side of the second extension portion 154b of the second frame 154 by screws. When the projection apparatus 10 is viewed from below with the adjustment device 100 attached to the projection apparatus 10, the pressing pad 158 is disposed so as to overlap regions where the rotating bodies 152b of base member 152 are in contact with adjustment rings 30 respectively. The pressing pad 158 attached to the second frame 154 is a part of the second frame 154, and comes into contact with the lower surface 20b of the housing 20 when the housing 20 is held by the adjustment unit 150. An upper surface 158a of the pressing pad 158 attached to the second extension portion 154b is a horizontal flat surface as shown in FIG. 9. The upper surface 158a of the pressing pad 158 is located slightly above a top of the second extension portion 154b. The pair of spring members 159 are so-called helical springs, and hook-shaped engaging portions are provided at both ends of each of spring members 159. The dust-proof member 156 and the dust-proof packing 157 are located between the pair of spring members 159 in the left-right direction.

Next, an assembly mode of each member constituting the adjustment unit 150 will be described. The first frame 153 and the second frame 154 are connected each other through the spring members 159. At first, the engaging portions of the upper ends of the respective spring members 159 are engaged with the first hook portions 153b1 of the first frame 153. Next, the left and right side portions of the second frame portion 154a of the second frame 154 are inserted into a space between the first frame portion 153a of the first frame 153 and the projecting portions 153a3 from the lower side of the space. Both of the left spring members 159 engaged with the left first hook portion 153b1 and the left second hook portion 154a2 of the second frame 154 and the right spring members 159 engaged with the right first hook portion 153b1 and the right second hook portion 154a2 of the second frame 154. have restoring forces in the vertical direction (holding direction, and are set to be extension or compressed in response to an external force in the opposite direction to resist the restoring forces.

Therefore, the first frame 153 and the second frame 154 are connected to each other via the two spring members 159, and the restoring force of the two spring members 159 is given to both of the frames 153, 154. In this state, since the front surface of the first frame 153 is located to the front side of the second frame 154, the left and right side portions of the upper end of the second frame portion 154a are located below the inner surface side of each of the first extension portions 153b. Therefore, even if the second frame 154 is moved upward, the upper end left and right side portions of the second frame portion 154a are brought into contact with the inner surface of each of the first extension portions 153b of the first frame 153, so that the second frame 154 does not separate from the first frame 153. The push portion 154c is exposed to the front side by the depression portion 153a2 and to the upper side by the opening between the pair of first extension portions 153b.

Next, the base member 152 is attached to each of the first extension portions 153b of the first frame in a state where the push portion 154c is accommodated in the push-down space 152c. Thereafter, the dust-proof member 156, the dust-proof packing 157, and the pressing pad 158 are assembled, thereby the adjustment unit 150 is completed. In the adjustment unit 150 assembled in this manner, as shown in FIG. 9, each of the rotary bodies 152b of the base member 152 and the pressing pad 158 are opposed to each other in the vertical direction. In a state in which each of the spring members 159 has a natural length (a stationary state in which an external force is not applied to the spring member 159 by an operator), the push-down surface 154c1 of the push portion 154c located around the push-down space 152c is substantially flush with the upper surface of the base member 152 in a plane direction. As shown in FIG. 9, in a state in which the adjustment unit 150 is not attached to the projection apparatus 10 and the push portion 154c is not pushed down, distance D1 between a bottom surface 152e of the base member 152 and an upper surface 158a of the pressing pad 158 is set to be slightly shorter (for example, shorter by 2 to 4 mm) than the thickness of the housing 20 of the projection apparatus 10.

Figure 10:
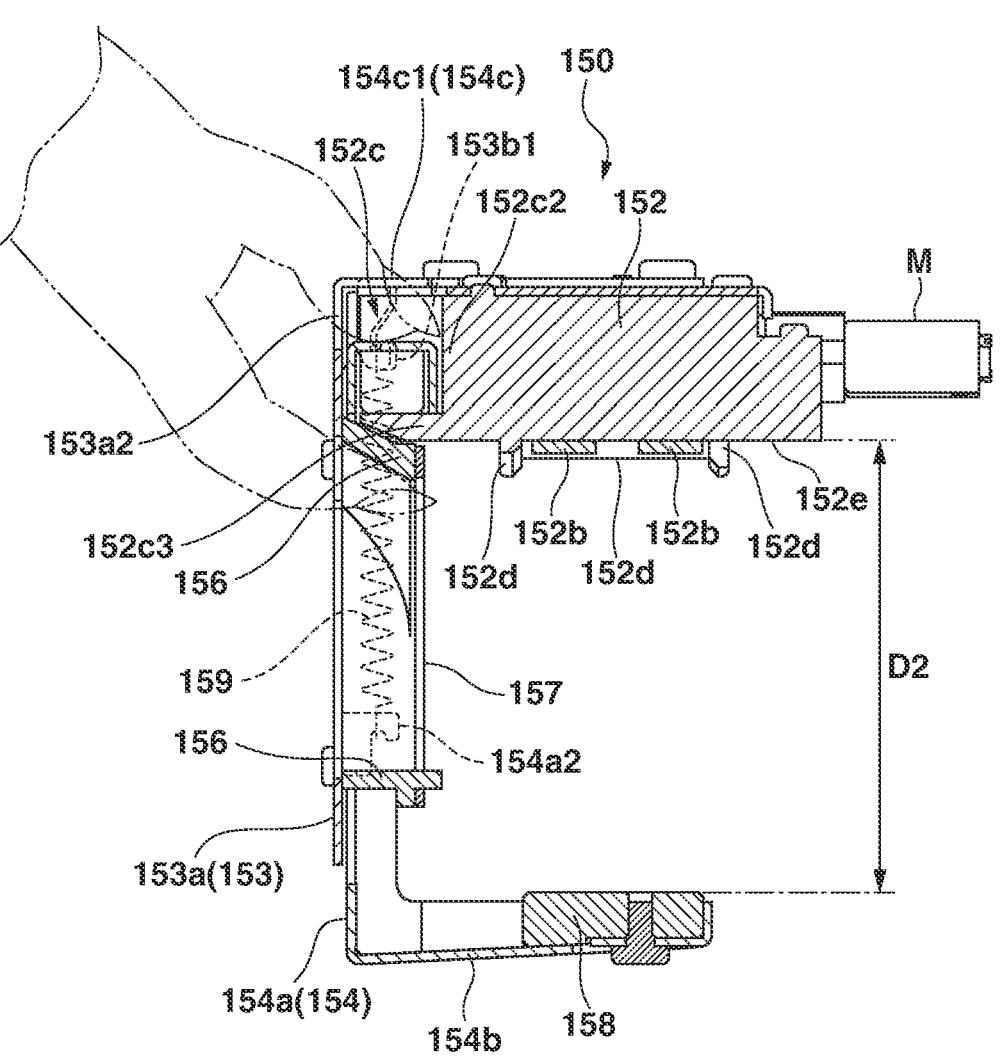
FIG. 10 is a cross-sectional view along the front-rear direction of the projection apparatus showing a step 2 for attaching the adjustment unit of the adjustment device to the projection apparatus.

The adjustment unit 150 configured as described above can be attached to the projection apparatus 10 in the following manner. First, as shown in FIG. 9, an operator puts his or her finger into the unit opening 150a to support the first frame 153 and, as shown in FIG. 10, pushes down the push-down surface 154c1 of the second frame 154. Therefore, as shown in FIG. 10, when the operator pushes down the push portion 154c while supporting the base member 152 via the dust-proof member 156, the push portion 154c is moved downward in the push-down space 152c, and the whole second frame 154 is moved downward, and each of the spring members 159 is stretched downward against its restoring force. As a result, as shown in FIG. 10, the distance between the base member 152 and the pressing pad 158 in the vertical direction is increased as distance D2. The distance D2 is not only longer than the distance D1 but also longer (for example, 6 to 8 mm longer) than the thickness of the housing 20 of the projection apparatus 10. In this state, the unit opening 150a is positioned so as to substantially coincide with the projection opening 23a of the housing 20, and then the housing 20 is positioned between the base member 152 and the pressing pad 158 from the front side of the projection opening 23a.

Figure 11:
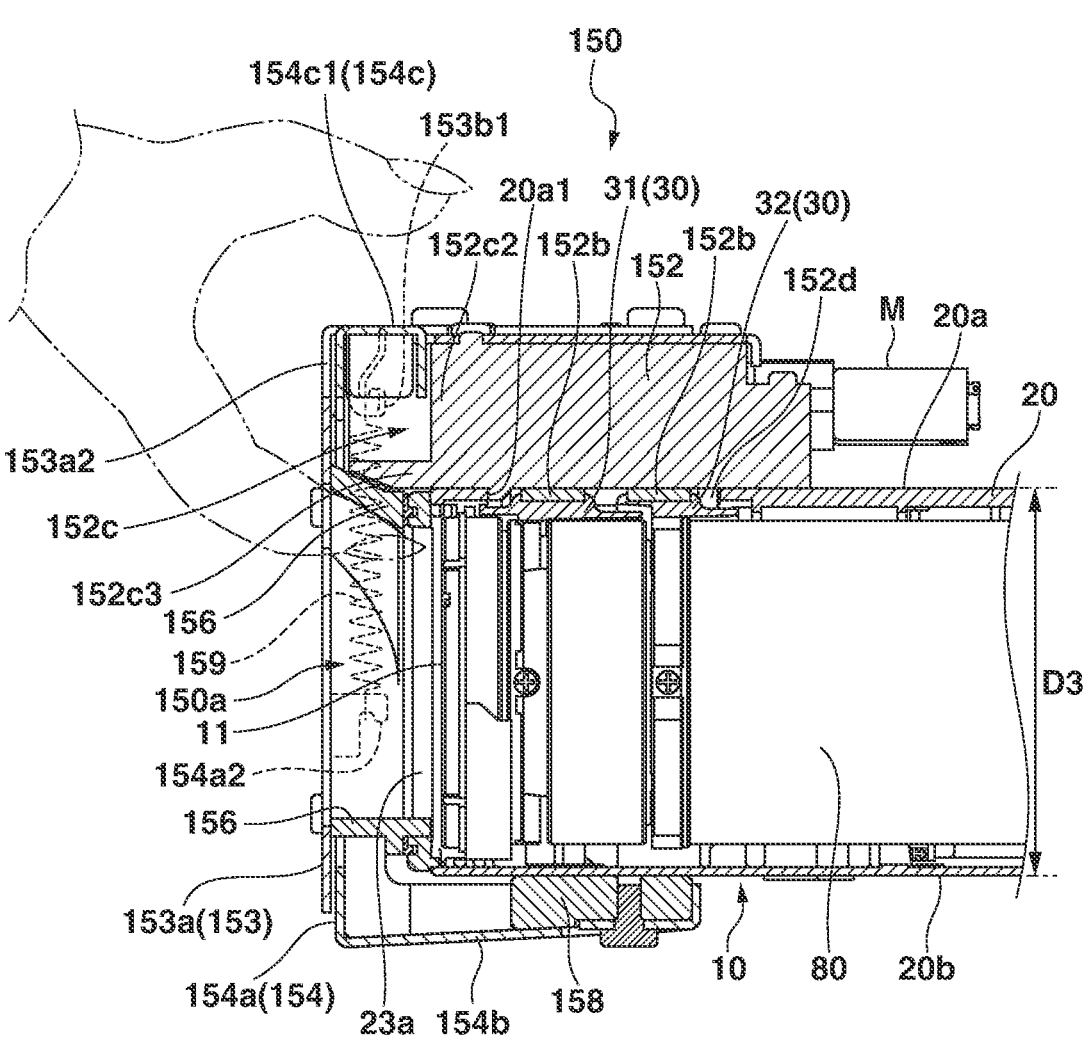
FIG. 11 is a cross-sectional view along the front-rear direction of the projection apparatus showing a step 3 for attaching the adjustment unit of the adjustment device to the projection apparatus.

At this time, as shown in FIG. 11, the engaging projection 152d of the base member 152 is engaged with the opening end of the adjustment opening 20a1, and the two rotating bodies 152b are brought into meshing contact with the focus adjustment ring 31 and the zoom adjustment ring 32 of the projection apparatus 10. When the depression of the push-down surface 154c1 is released by releasing the hand of the operator, the second frame 154 including the push-down surface 154c1 moves upward due to the restoring force of each of the spring members 159. By the movement of the second frame 154, each of the rotating bodies 152b is pressed against the adjustment rings 30, and the pressing pad 158 is brought into contact with the lower surface 20b of the housing 20, so that the housing 20 is held between each of the rotating bodies 152b and the pressing pad 158. In this state, the distance between the base member 152 and the pressing pad 158 in the vertical direction as distance D3 is set to be shorter than the distance D2 and longer than the distance D1. Therefore, the restoring force of the spring member 159 generates a force to press the housing 20 from both up and down directions by the respective rotating bodies 152b and the pressing pad 158, so that the adjustment unit 150 is not removed from the projection apparatus 10 unless the push portion 154c is pressed down.

As described above, the adjustment unit 150 is fixed to the housing 20 by holding the housing 20 between the base member 152 and the pressing pad 158. In this state, as shown in FIG. 7, the upwardly directed plate surface of each of the first extension portions 153*b* of the first frame 153 is substantially flush with the push-down surface 154*c*1. In the state where the adjustment unit 150 is fixed to the housing 20, the engaging projection 152*d* is engaged with the opening end of the adjustment opening 20*a*1, thereby preventing the adjustment unit 150 from being out of the correct position. By fixing the adjustment unit 150 to the housing 20 in this manner, the dust-proof packing 157 and a part of the front panel 23 around the projection opening 23*a* is closely sealed in the front-rear direction, and there is a no gap between members adjacent to each other around the opening space from the front side of the unit opening 150*a* to the projection portion 11 of the lens barrel 80 so that the projection portion 11 is protected from dust. Although the adjustment unit 150 can be attached from the lateral side of the housing 20, it is preferable to attach the adjustment unit 200 from the front side of the housing 20 in order to reliably seal the space between the dust-proof packing 157 and the projection opening 23*a*.

Further, the two rotating bodies 152*b* are in meshing contact with the focus adjustment ring 31 and the zoom adjustment ring 32. Therefore, when at least one of the rotating bodies 152*b* is rotated by at least one of the driving of the respective drive motors M in response to the reception of the drive signal from the remote controller, at least one of the focus adjustment rings 31 and the zoom adjustment ring 32 is rotated by the frictional force between the rotating bodies 152*b* and the adjustment rings 30. Accordingly, the focus adjustment ring 31 and the zoom adjustment ring 32 can be adjusted to focus and zoom. When the focus adjustment ring 31 or the zoom adjustment ring 32 is not rotatable (for example, when the focus adjustment ring 31 or the zoom adjustment ring 32 is rotated to the rotational limit in one direction and does not rotate in the same direction any more), the restoring force of the spring members 159 can be adjusted such that the rotating bodies 152*b* are in an idle for preventing the damage of the focus adjustment ring 31 or the zoom adjustment ring 32. The present disclosure is not limited to the above, when the focus adjustment ring 31 or the zoom adjustment ring 32 cannot rotate, excessive torque may be set not to be applied to the focus adjustment ring 31 or the zoom adjustment ring 32 by providing a torque limiter on the rotating shaft of the drive motor M.

The adjustment unit 150 fixed to the housing 20 can be removed from the housing 20 by reversing the above process. In other words, the adjustment unit 150 can be removed from the housing 20 by depressing the push-down surface 154*c*1 again to increase the vertical distance between the base member 152 and the pressing pad 158 to be larger than the thickness of the housing 20 of the projection apparatus 10.

After the adjustment unit 150 is fixed to the housing 20, By attaching the first holding metal plate 130, the second holding metal plate 140, and the drive substrate 120 to the housing 20, and finally attaching the protective cover 110, the entire adjustment device 100 can be attached to the projection apparatus 10. As shown in FIG. 1, in the adjustment device 100 attached to the projection apparatus 10, the push-down surface 154*c*1 (the upper surface of the push portion 154*c*) of the adjustment unit 150 is covered by the eaves portion 112 of the protective cover 110. Therefore, since the adjustment device 100 is prevented from touching the push-down surface 154*c*1 after being attached to the projection apparatus 10, the adjustment unit 150 is prevented from being erroneously detached.

As described above, the adjustment device 100 according to the present embodiment is provided with a base member 152 including the pair of the rotating bodies 152*b* that are brought into contact with the adjustment ring 30 provided in a projection apparatus 10 to rotate the adjustment ring 30 and a pair of electric drive motors M that rotationally drive the pair of rotating bodies 152*b*, and the first frame 153 and the second frame 154 that are associated to the base member 152 and sandwich the housing 20 in which the lens barrel 80 is housed with the base member 152, wherein the first frame 153 and the second frame 154 include a pair of spring members 159 that give restoring force to the first frame 153 and the second frame 154, and the housing 20 is sandwiched and fixed to the housing 20 by the restoring force of the pair of spring members 159.

The adjustment device 100 configured as described above can be attached to and detached from the since the housing 20 is sandwiched between the first frame 153 and the second frame 154 by utilizing the restoring force of the spring member 159, the first frame 153 and the second frame 154 can be easily fixed to the housing 20 Furthermore, the adjustment device 100 can be easily removed from the housing 20 by depressing the push-down surface 154*c*1 of the second frame 154). Furthermore, since the adjustment device 100 fixed to the housing brings the pair of rotating bodies 152*b* into meshing contact with the adjustment rings 30 of the housing 20, the adjustment rings 30 can be rotated via the respective rotating bodies 152*b* by electrically driving the drive motors M, and the adjustment rings 30 can be adjusted. Therefore, the adjustment device 100 of the present embodiment can adjust the adjustment rings 30 by remote operation using a remote control or the like even when the housing 20 having the lens barrel 80 housed therein is installed in a place (ceiling, wall, or the like) that is difficult for human hands to reach, for example, and can also easily adjust the adjustment rings 30 in the housing 20.

Further, the adjustment device 100 can provide the base member 152 is disposed so as to face the upper surface 20*a* of the housing 20 in which the adjustment opening 20*a*1 exposes the adjustment ring 30. The adjustment device 100 includes first frame 153 connected to the base member 152, and the second frame 154 having the pressing pad 158 contacting with the lower surface 20*b* opposite to the upper surface 20*a* of the housing 20. Also, the spring member 159 connects the first frame 153 and the second frame 154. Therefore, a specific configuration can hold the housing 20 between the first frame 153 and the second frame 154 in the thickness direction of the housing 20 and impart an elastic force due to the restoring force of the spring member 159 to the first frame 153 and the second frame 154.

The gripping force between the rotating body 152*b* and the corresponding adjustment ring 30 generated when the rotating body 152*b* rotates due to the driving of the drive motor M affects the amount of rotation of the adjustment ring 30 and depends on the relative position between the rotating body 152*b* and the corresponding adjustment ring 30. Here, due to the contact with the rotating body 152*b* in accordance with rotation, a force is applied to the corresponding adjustment ring 30 in the direction of separating from the rotating body 152*b*. However, when the projection apparatus 10 is viewed from below while the adjustment device 100 is attached to the projection apparatus 10, the pressing pad 158 is arranged so as to overlap with the regions where the rotating bodies 152*b* of the base member 152 and the adjustment rings 30 are in contact with each other. In other words, since the pressing pad 158 is fixed to the housing 20 at a position just behind the position of the housing 20 where the force to separate is generated, the pressing pad 152 can press the housing 20 of the projection apparatus 10 so as not to displace the correct position between the adjustment ring 30 and the corresponding rotating body 152*b* by holding the housing 20 of the projection apparatus 10, and thus the adjustment ring 30 can be rotated with a stable rotation amount.

As described above, since the adjustment device 100 can be attached to the projection apparatus 10 with a simple structure, the number of screw holes for screwing the adjustment device 100 around the adjustment rings 30 in the housing 20 of the projection apparatus 10 can be reduced as much as possible. Therefore, the risk of cracking around the screw hole due to aging degradation can be reduced.

In the adjustment device 100, the first frame 153 has a first hook section 153*b*1 to which one end of the spring member 159 is engaged, the second frame 154 has a second hook section 153 *a*2 to which the other end of the spring member 159 is engaged, and the spring members 159 are elastic in the vertical direction in response to an appropriate external force. Therefore, it is possible to provide a specific configuration for connecting the first frame 153 and the second frame 154 by the spring members 159 so as to be be extension or compressed in the vertical direction, that is, in the thickness direction of the housing 20.

In the adjustment device 100, the second frame 154 has the push-down surface 154*c*1 for adjusting the distance in the vertical direction between the base member 152 and the second frame 154 against the restoring force of the spring member 159 when pushed down. Therefore, the distance D3 between the base member 152 and the second frame 154 (in this embodiment, the pressing pad 158) can be adjusted by pressing the push-down surface 154*c*1, and the housing 20 can be easily sandwiched between the base member 152 and the second frame 154.

Also, in the adjustment device 100, the first frame 153 has the first extension portions 153*b* provided parallel to the push-down surface 154*c*1 on both sides of the push-down surface 154*c*1, and the push-down surface 154*c*1 can be set so that the position in the vertical direction matches that of the first extension portions 153*b* in a state where the housing 20 is sandwiched between the base member 152 and the second frame 154. According to this configuration, when the housing 20 is not securely sandwiched between the base member 152 and the second frame 154, the positions of the push-down surface 154*c*1 and the first extension portions 153*b* in the vertical direction do not coincide with each other, so that insufficient holding of the housing 20 can be easily confirmed. Therefore, the housing 20 can be securely sandwiched and fixed between the base member 152 and the second frame 154.

Further, the adjustment device 100 includes the protective cover 110 that is attached to the housing 20 and covers the push-down surface 154*c*1 and protects the base member 152. According to this configuration, since the protective cover 110 covers the push-down surface 154*c*1, it is possible to prevent the push-down surface 154*c*1 from being erroneously depressed after attaching the adjustment device to the housing 20, and it is possible to prevent the adjustment device 100 from being unintentionally dropped from the housing 20.

The adjustment device 100 includes the receiving member 122 for receiving a signal for driving the drive motor M, a drive substrate 120 for controlling the drive of the drive motor M, and the protective cover 110 is attached to the housing 20 so as to cover the receiving member 122 and the drive substrate 120. Therefore, it is possible to provide a specific configuration for electrically driving the drive motor M by remote control and a configuration for protecting such a configuration from the outside by the protective cover 110.

Further, in the adjustment device 100, the first frame 153 and the second frame 154 are opened at the positions corresponding to the projection opening 23*a* of the housing 20 from which light is emitted from the lens barrel 80, and the dust-proof member 156 and the dust-proof packing 157 are provided for sealing the space between around the projection opening 23*a* and the first and second frames 153, 154. Therefore, there is a no gap from the members around the openings of the first and second frames 153, 154 to the opening end of the projection opening 23*a*, and the dust of the projection opening 23*a* can be prevented. Furthermore, since the base member 152 covers the adjustment opening 20*a*1, it is possible to prevent interfering objects such as dust and oil from entering the housing 20 from the adjustment opening 20*a*1. Therefore, there is no interfering object that changes the gripping force between the adjustment ring 30 and the corresponding rotating body 152*b*, so that the adjustment ring 30 is rotated by an appropriate amount by the rotating body 152*b*.

In the adjustment device 100, a plural the spring members 159 are provided so as to sandwich the dust-proof member 156 and the dust-proof packing 157. Therefore, the force for holding the housing 20 between the base member 152 and the second frame 154 can be sufficient, and the restoring force of the spring member 159 for holding the housing 20 can be easily adjusted.

In the adjustment device 100, the base member 152 has the engaging projection 152*d* that is engaged with the opening end of the adjustment opening 20*a*1. According to this configuration, since the engaging projection 152*d* is engaged with the opening end of the adjustment opening 20*a*1, each of the rotating bodies 152*b* of the base member 152 can be easily brought into meshing contact with each of the adjustment rings 30 exposed from the adjustment opening 20*a*1. In this manner, it is possible to provide a specific configuration for bringing each of the rotating bodies 152*b* into meshing contact with the adjustment ring 30.

Further, in the adjustment device 100, the rotating body 152*b* is brought into contact with the corresponding adjustment ring 30 by a force so as to idle when the adjustment ring 30 cannot rotate. Therefore, the rotation of the rotary body 152*b* can be prevented from being stopped when the corresponding adjustment ring 30 cannot rotate, and the mechanism for rotating the rotary body 152*b* and the rotary body 152*b* provided in the base member 152 can be prevented from being damaged.

It should be noted that the above-described embodiments are presented as examples and are not intended to limit the scope of the invention. These embodiments can be implemented in various other forms, and various omissions, substitutions, and changes can be made without departing from the concept of the invention. These embodiments and modifications thereof are included in the scope and gist of the invention and also in the scope equivalent to the invention described in the claims.

For example, in the above-described embodiment, the adjustment ring exposed from the adjustment opening is not provided with a knob (holding portion) or the like. Even in this case, by pressing the rotating body of the base portion against the adjustment ring, the adjustment ring can be rotated by remote control in accordance with the rotation of the rotating body by electric operation. Further, for example, it is possible to substitute a gear with the rubber roller as the rotating body in the above-described embodiment. Even in this case, when the gear pushes the adjustment ring, the adjustment ring can be physically rotated along with the rotational drive of the gear. Further, in the above-described embodiment, a coiled spring member is used as the elastic member, but the present disclosure is not limited to this, and a damper such as a plate spring, a gas spring, or a hydraulic type may be used.

What is claimed is:

1. An adjustment device comprising:
a base member configured to move an adjustment member of an electronic device; and
a holding member configured to hold the base member and the electronic device,
wherein:
the holding member includes an elastic member and holds the base member and the electronic device by a restoring force of the elastic member;
the base member faces a first main surface of the electronic device;
the first main surface includes an adjustment opening through which the adjustment member is exposed;
the holding member includes a first frame connected to the base member and a second frame in which a portion is in contact with a second main surface of the electronic device opposite to the first main surface; and
the elastic member connects the first frame with the second frame.

2. The adjustment device according to claim 1, wherein the first frame includes a first engagement piece engaged with one end side of the elastic member,
wherein the second frame includes a second engagement piece engaged with the other end side of the elastic member,
wherein the elastic member is expandable and contractible in a holding direction in response to an external force.

3. The adjusting device according to claim 2, wherein the second frame includes a pressing surface configured to adjust a distance between the base member and the second frame in the holding direction against a restoring force of the elastic member by pressing the pressing surface.

4. The adjustment device according to claim 3, wherein a distance between the base member and the second frame in the holding direction in a state in which the pressing surface is pressed and the holding member does not hold the electronic device is longer than a distance between the base member and the second frame in the holding direction in a state in which the pressing surface is not pressed and the holding member does not hold the electronic device.

5. The adjustment device according to claim 3, wherein a distance between the base member and the second frame in the holding direction in a state where the pressing surface is pressed and the holding member does not hold the electronic device is longer than a thickness of the electronic device in the holding direction.

6. The adjustment device according to claim 3, wherein a distance between the base member and the second frame in the holding direction in a state in which the holding member holds the electronic device is longer than a distance between the base member and the second frame in the holding direction in a state in which the pressing surface is not pressed and the holding member does not hold the electronic device.

7. The adjustment device according to claim 3, wherein the first frame has both side surfaces provided in parallel with the pressing surface on both sides of the pressing surface, and a position of the pressing surface substantially coincides with positions of both side surfaces in the holding direction in a state in which the electronic device is held between the base member and the holding member.

8. The adjustment device according to claim 3, further comprising a protective cover is attachable to the electronic device to cover the pressing surface and protect the base member.

9. The adjustment device according to claim 8, further comprising a receiving member configured to receive a signal for driving the base member; and a driving board configured to control driving of the base member, wherein the protective cover is attachable to the electronic device so as to cover the receiving member and the driving board.

10. The adjusting device according to claim 1, wherein the base member includes a protrusion engaging with an opening end of the adjustment opening.

11. The adjusting device according to claim 1, wherein the electronic device includes a lens barrel,
wherein the adjustment member includes a rotated body configured to adjust at least one of focus and zoom in the lens barrel,
wherein the base member includes a rotating body configured to rotate the rotated body and a driving member configured to drive the rotating body,
wherein the rotating body presses the adjustment member with a force such that the rotating body idles when the adjustment member is not rotatable.

12. An electronic device system comprising:
the adjustment device according to claim 1; and
the electronic device.

13. An adjustment device comprising:
a base member configured to move an adjustment member of an electronic device; and
a holding member configured to hold the base member and the electronic device, wherein:
the holding member includes an elastic member and holds the base member and the electronic device by a restoring force of the elastic member;
the base member faces a first main surface of the electronic device;
the first main surface includes an adjustment opening through which the adjustment member is exposed;
the holding member includes a first frame connected to the base member and a second frame in which a portion is in contact with a second main surface of the electronic device opposite to the first main surface;
the elastic member connects the first frame with the second frame;
the electronic device includes a lens barrel; and
the holding member includes a sealing member configured to seal an opening end of a projection port opening is open at a position corresponding to the projection port opening of the electronic device through which light from the lens barrel is emitted.

14. The adjusting device according to claim 13, wherein the elastic member includes a set of elastic portions provided both sides of the sealing member respectively.

* * * * *